United States Patent
Akiyama

(10) Patent No.: US 11,280,702 B2
(45) Date of Patent: Mar. 22, 2022

(54) TANDOM MOTOR SYSTEM

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/290,194

(22) PCT Filed: Aug. 20, 2019

(86) PCT No.: PCT/JP2019/032483
§ 371 (c)(1),
(2) Date: Apr. 29, 2021

(87) PCT Pub. No.: WO2020/095507
PCT Pub. Date: May 14, 2020

(65) Prior Publication Data
US 2021/0318205 A1 Oct. 14, 2021

(30) Foreign Application Priority Data
Nov. 5, 2018 (JP) .............................. JP2018-208191

(51) Int. Cl.
*G01M 17/007* (2006.01)
*B60K 1/02* (2006.01)
*G01M 99/00* (2011.01)

(52) U.S. Cl.
CPC ............. *G01M 17/007* (2013.01); *B60K 1/02* (2013.01); *G01M 99/007* (2013.01)

(58) Field of Classification Search
CPC .............................. G01M 17/00; G01M 13/00
See application file for complete search history.

(56) References Cited

U.S. PATENT DOCUMENTS

| | | | | |
|---|---|---|---|---|
| 5,262,717 A * | 11/1993 | Bolegoh | .................... | G01L 3/26 324/765.01 |
| 6,768,940 B2 * | 7/2004 | Akiyama | ............ | G01M 15/044 701/114 |
| 6,775,610 B2 * | 8/2004 | Akiyama | ............ | G01M 15/044 701/110 |
| 6,789,023 B2 * | 9/2004 | Tsai | ......................... | G01M 1/10 702/33 |

(Continued)

FOREIGN PATENT DOCUMENTS

| | | |
|---|---|---|
| JP | 2008-286614 A | 11/2008 |
| JP | 5561444 B2 | 7/2014 |
| WO | WO-2013187453 A1 | 12/2013 |

OTHER PUBLICATIONS

Notice of Reasons for Rejection issued to JP Application No. 2018-208191, dated Oct. 1, 2019, with English translation (6 pages).

*Primary Examiner* — Tran M. Tran
(74) *Attorney, Agent, or Firm* — Muncy, Geissler, Olds & Lowe, PC

(57) ABSTRACT

A shaft torque control device includes a feedback control system having: a generalized plant P including a nominal plant model N representing the input/output characteristic of a test system including a tandem dynamometer system; and a controller K for applying a first and second control inputs u1, u2 to the generalized plant P on the basis of a first observed output y1 and second observed output y2. The controller K has been designed using a computer so as to satisfy a prescribed design condition. For the generalized plant P, defined are: a first control amount output z1 resulting from weighting the first observed output y1 using a weighting function Ge(s); a second control amount output z2 resulting from weighting a front transmission torque t1 using a weighting function Gt1(s); and a third control amount output z3 resulting from weighting a rear transmission torque t2 using a weighting function Gt2(s).

13 Claims, 10 Drawing Sheets

(56) References Cited

U.S. PATENT DOCUMENTS

| | | | |
|---|---|---|---|
| 6,981,423 B1* | 1/2006 | Discenzo | G01L 3/12 73/800 |
| 7,200,484 B2* | 4/2007 | Yasui | F02D 41/1402 123/399 |
| 7,305,297 B2* | 12/2007 | Yasui | F02D 41/1402 123/399 |
| 7,523,011 B2* | 4/2009 | Akiyama | G06K 9/00516 702/119 |
| 8,604,745 B2* | 12/2013 | Villwock | H02P 21/16 318/806 |
| 9,116,062 B2* | 8/2015 | Akiyama | G01L 3/24 |
| 9,207,149 B2* | 12/2015 | Kanke | G01M 13/025 |
| 9,234,820 B2* | 1/2016 | Akiyama | G01M 15/00 |
| 9,400,231 B2* | 7/2016 | Akiyama | G01L 3/242 |
| 9,459,181 B2* | 10/2016 | Akiyama | G01M 17/007 |
| 9,689,774 B2* | 6/2017 | Kanke | G01M 13/025 |
| 9,739,687 B2* | 8/2017 | Akiyama | G01M 15/05 |
| 10,151,666 B2* | 12/2018 | Kanke | G01M 15/044 |
| 10,352,794 B2* | 7/2019 | Guan | G01M 5/0041 |
| 10,393,604 B2* | 8/2019 | Pfister | G01L 3/00 |
| 10,469,007 B2* | 11/2019 | Nayfeh | B60W 20/10 |
| 10,545,071 B2* | 1/2020 | Boerhout | G01M 13/028 |
| 10,564,032 B2* | 2/2020 | Fujita | G01M 7/02 |
| 11,029,651 B2* | 6/2021 | Tajima | G05B 13/0265 |
| 2015/0013443 A1 | 1/2015 | Kanke et al. | |
| 2015/0142341 A1 | 5/2015 | Akiyama et al. | |
| 2019/0190416 A1* | 6/2019 | Lee | H02P 21/18 |
| 2020/0333201 A1* | 10/2020 | Vadamalu | G01M 15/046 |
| 2020/0412341 A1* | 12/2020 | Vadamalu | H03H 17/0219 |
| 2021/0247251 A1* | 8/2021 | Akiyama | G05B 11/40 |
| 2021/0300463 A1* | 9/2021 | Kodera | B62D 5/005 |

\* cited by examiner

TANDOM MOTOR SYSTEM

TECHNICAL FIELD

The present invention relates to a shaft torque control device. In more detail, it relates to a shaft torque control device of a tandem motor system equipped with two motors connected in series.

BACKGROUND ART

Drivetrain refers to a generic term for a plurality of devices for transferring the energy generated by an engine to drive wheels, and is configured by an engine, clutch, transmission, drive shaft, propeller shaft, differential gears, drive wheels, etc. In the test system of a drivetrain, by actually driving the transmission with the engine, and electrical inertia controlling an output-side dynamometer connected to this output shaft, the durability performance, quality, etc. of the drivetrain which is the test piece are evaluated while applying load torque imitating the inertia of the tires and vehicle body to the output shaft.

In addition, Patent Document 1 proposes a test system which generates drive torque that is inputted to an input shaft of the test piece using a tandem dynamometer system made by connecting two dynamometers in series. According to the test system of Patent Document 1, by establishing two dynamometers in series, it is possible to generate great drive torque, without increasing the diameter of each dynamometer.

Patent Document 1: Japanese Patent No. 5561444

DISCLOSURE OF THE INVENTION

Problems to be Solved by the Invention

However, when connecting two dynamometers in series, there are cases where large oscillations occur in the shaft torque between the dynamometer and test piece due to torsional resonance of the shaft connecting these dynamometers. Patent Document 1 shows technology for designing, based on a generalized plant, a shaft torque control device of a tandem dynamometer system including a function of suppressing such torsional resonance. However, Patent Document 1 does not sufficiently consider a function of suppressing deviation between the shaft torque command value and shaft torque detection value. For this reason, with the shaft torque control device designed by the design method shown in Patent Document 1, there are cases where deviation occurs between the shaft torque command value and shaft torque detection value, as explained later by referencing FIG. 7.

The present invention has an object of providing a shaft torque control device of a tandem motor system including both a shaft torque deviation suppressing function of suppressing the deviation between the shaft torque detection signal and the shaft torque command signal for the shaft torque between the first motor and load equipment, and a resonance suppressing function of suppressing torsional resonance of the shaft connecting each motor and the test piece.

Means for Solving the Problems

A first aspect of the present invention is a shaft torque control device (for example, the shaft roque control device 5 described later) for a tandem motor system which establishes, as a control target, a tandem motor system (for example, the test system 1 described later) comprising: load equipment (for example, the test piece W described later) including a load shaft (for example, the input shaft SI described later); a first motor (for example, the front dynamometer 21 described later) having a first output shaft (for example, the output shaft S1 described later) connected to the load shaft, and which generates torque according to a first torque current command signal (for example, the front torque current command signal described later); a second motor (for example, the rear dynamometer 22 described later) having a second output shaft (for example, the output shaft S2 described later) connected to the first output shaft, and which generates torque according to a second torque current command signal (for example, the rear torque current command signal described later); and a shaft torque detector (for example, the front shaft torque meter 25 described later) which generates a shaft torque detection signal (for example, the front shaft torque detection signal described later) according to shaft torque between the load equipment and the first motor, the shaft torque control device generating the first torque current command signal and the second torque current command signal so as to suppress shaft torque deviation between a shaft torque command signal (for example, the higher order shaft torque command signal described later) for the shaft torque and the shaft torque detection signal. The shaft torque control device according to the present invention comprises a controller (for example, the controller K described later) which is designed by a computer so as to satisfy a predetermined design condition, in (for example, the feedback control system 8 described later) a feedback control system including: a generalized plant (for example, the generalized plant P described later) having a nominal model (for example, the nominal model N described later) imitating an input/output characteristic of the control target; and the controller for applying a first control input (for example, the first control input u1 described later) corresponding to the first torque current command signal and a second control input (for example, the second control input u2 described later) corresponding to the second torque current command signal, based on a first observed output (for example, the first observed output y1 described later) corresponding to the shaft torque deviation and a second observed output (for example, the second observed output y2 described later) corresponding to the shaft torque detection signal; the nominal model generates a first model output (for example, the front transfer torque t1 described later) corresponding to a shaft torque between the load equipment and the first motor, and a second model output (for example, the rear transfer torque t2 described later) corresponding to a shaft torque between the first motor and the second motor, based on a first model input (for example the front torque i1 described later) generated based on the first control input and a second model input (for example, the rear torque i2 described later) generated based on the second control input; and the generalized plant defines a first control amount output (for example, the first control amount output z1 described later) obtained by weighting the first observed output by a first weighting function (for example, the first control amount weighting function Ge(s) described later), a second control amount output (for example, the second control amount output z2 described later) obtained by weighting the first model output by a second weighting function (for example, the second control amount weighting function Gt1(s) described later), and a third control amount output (for example, the third control amount output z3 described later)

obtained by weighting the second model output by a third weighting function (for example, the third control amount weighting function Gt2(s) described later).

According to a second aspect of the present invention, in this case, it is preferable for the generalized plant to further define a fourth control amount output (for example, the fourth control amount output z4 described later) obtained by weighting a difference between the first control input and the second control input by a fourth weighting function (for example, the fourth control amount weighting function Gie(s) described later).

According to a third aspect of the present invention, in this case, it is preferable for a target for a proportion of the first torque current command signal relative to a sum of the first torque current command signal and the second torque current command signal to be defined as a first target proportion (for example, the first target proportion r1 described later), and a target for a proportion of the second torque current command signal relative to the sum to be defined as a second target proportion (for example, the second target proportion r2 described later), and the generalized plant to further define a fourth control amount output (for example, the fourth control amount output z4' described later) obtained by weighting a difference between a product of the first control input and the second target proportion and a product of the second control input and the first target proportion, by a fourth weighting function (for example, the fourth control amount weighting function Gie(s) described later).

According to a fourth aspect of the present invention, in this case, it is preferable for the load equipment to be a drivetrain (for example, the test piece W described later) for a vehicle which changes speed of dynamic force inputted to the load shaft and transfers to an output shaft (for example, the output shaft SO1, SO2 described later), and the tandem motor system to be a test system (for example, the test system 1 described later) of a drivetrain including a load motor (for example, the first output-side dynamometer 31 and second output-side dynamometer 32 described later) that applies load to the output shaft.

Effects of the Invention

The shaft torque control device according to the first aspect of the present invention includes a controller designed by a computer so as to satisfy predetermined design conditions, in a feedback control system including: a generalized plant including a nominal model simulating the input/output characteristics of a tandem motor system; and a controller applying a first control input corresponding to the first torque current command signal and a second control input corresponding to the second torque current command signal to the generalized plant, based on the first observed output corresponding to shaft torque deviation and the second observed output corresponding to the shaft torque detection signal. In addition, in the present invention, the shaft torque control device is designed based on the generalized plant which defines: the first control amount output obtained by weighting the first observed output corresponding to the shaft torque device by the first weighting function; the second control amount output obtained by weighting the first model output of the nominal model corresponding to the shaft torque between the load equipment and first motor by the second weighting function; and the third control amount output obtained by weighting the second model output of the nominal model corresponding to the shaft torque between the first motor and second motor by the third weighting function. The shaft torque control device including both a shaft torque deviation suppressing function of suppressing the deviation between the shaft torque command signal and the shaft torque detection signal, and a resonance suppressing function of suppressing torsional resonance in each shaft connecting the respective motors and load equipment, can thereby be obtained.

In the second aspect of the present invention, the shaft torque control device is designed based on the generalized plant which further defines a fourth control amount output obtained by weighting a difference between the first control input corresponding to the first torque current command signal and the second control input corresponding to the second torque current command signal by a fourth weighting function. According to the shaft torque control device designed based on such a generalized plant, it is possible to realize a torque distributing function which controls the shaft torque so that the first torque current command signal for the first motor and the second torque current command signal for the second motor become equal, i.e. so that the torque load of the first motor and the torque load of the second motor become equal.

In the third aspect of the present invention, the shaft torque control device is designed based on the generalized plant which further defines the fourth control amount output obtained by weighting the difference between the product of the first control input and second target proportion and the product of the second control input and first target proportion by the fourth weighting function. According to the shaft torque control device designed based on such a generalized plant, it is possible to realize a torque distributing function which controls the shaft torque so that the ratio of the first torque current command signal for the first motor and the second torque current command signal for the second motor becomes the first target proportion to second target proportion, i.e. so that the ratio of the torque load of the first motor and the torque load of the second motor becomes the first target proportion to second target proportion.

In the fourth aspect of the present invention, the load equipment is defined as a drivetrain for a vehicle which changes speed of dynamic force inputted to the load shaft and transfers to an output shaft, and establishes the tandem motor system as a test system of a drivetrain including a load motor which applies a load to the output shaft of the drivetrain. It is thereby possible to accurately evaluate the performance of the drivetrain while suppressing deviation between the shaft torque command signal and shaft torque detection signal, while suppressing torsional resonance in each shaft coupling the respective motors and the drivetrain.

PREFERRED MODE FOR CARRYING OUT THE INVENTION

Figure 1:
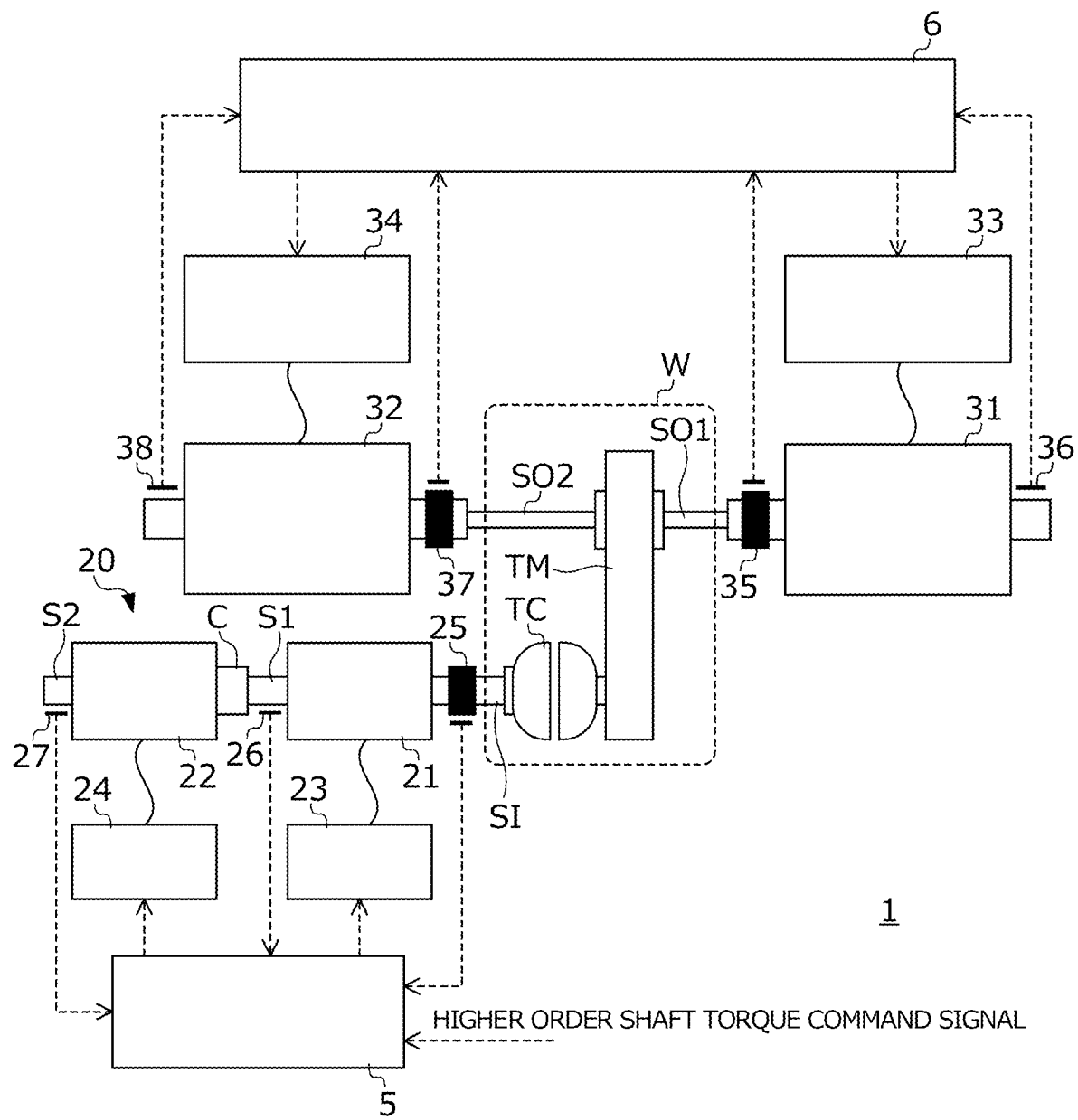
FIG. 1 is a view showing a test system of a drivetrain to which a shaft torque control device according to an embodiment of the present invention was applied.

Hereinafter, an embodiment of the present invention will be explained in detail while referencing the drawings. FIG. 1 is a view showing the configuration of a test system 1 of a drivetrain equipped with a shaft torque control device 5 according to the present embodiment. It should be noted that FIG. 1 shows an example of the test system 1 which uses a drive train of a vehicle of FF drive type, and evaluates performance of this test piece W; however, the present invention is not limited thereto. The test piece W may be established as a drivetrain of a vehicle of FR drive type, for example.

The test piece W is the drivetrain for a vehicle, and includes: an input shaft SI to which an engine (not shown) is connected in a state equipped to a completed car; left/right output shafts SO1, SO2 which are drive shafts; a torque converter TC which amplifies dynamic force inputted to the input shaft SI and transfers to the output shafts SO1, SO2; and a transmission TM which changes speed of dynamic force inputted to the input shaft SI, and transfers to the output shafts SO1, SO2.

The test system 1 includes: a front dynamometer 21, rear dynamometer 22, front inverter 23, rear inverter 24, front shaft torque meter 25, front encoder 26, rear encoder 27 and shaft torque control device 5 which are provided to a side of the input shaft SI of the test piece W; and a first output-side dynamometer 31, second output-side dynamometer 32, first output-side inverter 33, second output-side inverter 34, first output-side shaft torque meter 35, first output-side encoder 36, second output-side shaft torque meter 37, second output-side encoder 38 and output-side control device 6 which are provided to the side of the output shafts SO1, SO2 of the test piece W.

A leading end side of the output shaft S1 of the front dynamometer 21 is connected to the input shaft SI of the test piece W. The front inverter 23, when a front torque current command signal generated by the shaft torque control device 5 is inputted, provides electric power according to this front torque current command signal to the front dynamometer 21. The front dynamometer 21 thereby generates torque according to the front torque current command signal.

The leading end side of the output shaft S2 of the rear dynamometer 22 is connected via a coupling C to a base end side of the output shaft S1 of the front dynamometer 21. The rear inverter 24, when the rear torque current command signal generated in the shaft torque control device 5 is inputted, provides electric power according to this rear torque current command signal to the rear dynamometer 22. The rear dynamometer 22 thereby generates torque according to the rear torque current command signal.

In the above way, the test system 1 is a so-called tandem dynamometer system in which a tandem dynamometer 20, which is configured by connecting in series the front dynamometer 21 and rear dynamometer 22, is connected to the input shaft SI of the test piece W.

The front shaft torque meter 25 generates a front shaft torque detection signal according to the front shaft torque between the output shaft S1 of the front dynamometer 21 and the input shaft SI of the test piece W, and inputs this to the shaft torque control device 5. The front encoder 26 detects the revolution speed (number of revolutions per unit time of the shaft) of the output shaft S1 of the front dynamometer 21, generates a front speed detection signal according to the revolution speed, and inputs this to the shaft torque control device 5. The rear encoder 27 detects the revolution speed of the output shaft S2 of the rear dynamometer 22, generates a rear speed detection signal according to this revolution speed, and inputs this to the shaft torque control device 5.

The shaft torque control device 5 generates the front torque current command signal and rear torque current command signal, based on the front shaft torque detection signal by the front shaft torque meter 25, and a higher order shaft torque command signal corresponding to a command signal for the front shaft torque detected by the front shaft torque meter 25, and then inputs these torque current command signals to the front inverter 23 and rear inverter 24. It should be noted that the higher order shaft torque command signal is generated in a higher order controller (not shown) according to the contents of the test on the test piece W. The shaft torque control device 5 causes drive torque simulating the engine of a completed car to which the test piece W is installed to be generated in the tandem dynamometer 20, and drives the input shaft SI of the test piece W.

The shaft torque control device 5 at least includes both functions of a shaft torque deviation suppressing function of generating the front torque current command signal and rear torque current command signal so as to suppress the shaft torque deviation (higher order shaft torque command signal-front shaft torque detection signal) between the higher order shaft torque command signal and front shaft torque detection signal; and a resonance suppressing function of suppressing torsional resonance between the output shaft S1 and input shaft SI, and between the output shaft S2 and output shaft S1. The shaft torque control device 5 includes this shaft torque deviation suppressing function and resonance suppressing function are obtained by designing in accordance with the sequence explained later by referencing FIGS. 2 to 4, 9, etc.

The output shaft of the first output-side dynamometer 31 is connected to the output shaft SO1 of the test piece W. The first output-side inverter 33, when the first output-side torque current command signal generated by the output-side control device 6 is inputted, supplies electric power according to this first output-side torque current command signal to the first output-side dynamometer 31. The first output-side dynamometer 31 thereby generates torque according to the first output-side torque current command signal. The first output-side shaft torque meter 35 generates the first output-side shaft torque detection signal according to the shaft torque between the output shaft of the first output-side dynamometer 31 and the output shaft SO1 of the test piece W, and inputs to the output-side control device 6. The first output-side encoder 36 detects the revolution speed of the output shaft of the first output-side dynamometer 31, generates the first output-side speed detection signal according to the revolution speed, and inputs to the output-side control device 6.

The output shaft of the second output-side dynamometer 32 is connected to the output shaft SO2 of the test piece W. The second output-side inverter 34, when the second output-side torque current command signal generated by the output-side control device 6 is inputted, supplies electric power according to this second output-side torque current command signal to the second output-side dynamometer 32. The second output-side dynamometer 32 thereby generates torque according to the second output-side torque current command signal. The second output-side shaft torque meter 37 generates a second output-side shaft torque detection signal according to the shaft torque between the output shaft of the second output-side dynamometer 32 and the output shaft SO2 of the test piece W, and inputs to the output-side control device 6. The second output-side encoder 38 detects the revolution speed of the output shaft of the second output-side dynamometer 32, generates a second output-side speed detection signal according to this revolution speed, and inputs this to the output-side control device 6.

The output-side control device 6 generates a first output-side torque current command signal and second output-side torque current command signal, using input signals such as the first output-side shaft torque detection signal from the first output-side shaft torque meter 35, the first output-side speed detection signal from the first output-side encoder 36, the second output-side shaft torque detection signal from the second output-side shaft torque meter 37, and the second output-side speed detection signal from the second output-side encoder 38, and inputs these to the first output-side inverter 33 and second output-side inverter 34. The output-side control device 6 thereby applies loads simulating the tire inertia and vehicle body inertia of the completed car to which the test piece W is installed, to the output shafts SO1, SO2 via the first output-side dynamometer 31 and second output-side dynamometer 32.

In the test system 1, simultaneously with driving the input shaft SI of the test piece W by the shaft torque control device 5, evaluates the durability, quality, etc. of the test piece W under a state close to an actual car traveling state, by applying a load simulating the tire inertia and vehicle body inertia to the output shafts SO1, SO2 of the test piece W by the output-side control device 6.

Next, a sequence of designing the shaft torque control device 5 equipped with the above such shaft torque deviation suppressing function and resonance suppressing function will be explained while referencing the drawings.

Figure 2:
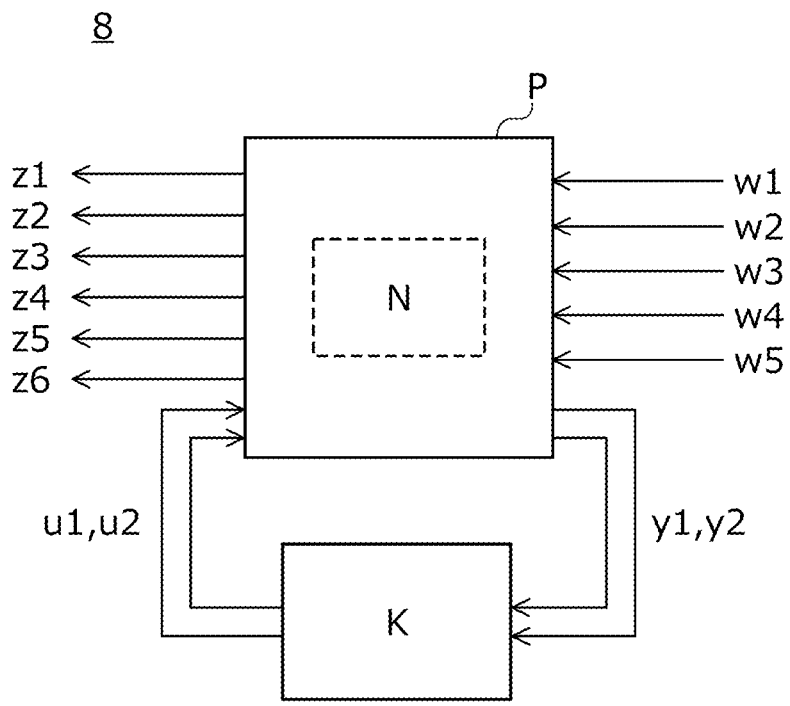
FIG. 2 is a view showing the configuration of a feedback control system used upon designing a shaft torque control device.

FIG. 2 is a view showing the configuration of a feedback control system 8 used upon designing the shaft torque control device 5. The shaft torque control device 5 defines a feedback control system 8 such as that shown in FIG. 2, and is configured by implementing the controller designed so that predetermined design conditions are satisfied in this feedback control system 8, in hardware including input/output ports such as a digital signal processor and microcontroller.

In addition, in the test system 1 configured in the above way, the shaft torque control device 5 in which a controller K described later is implemented, when the higher order shaft torque command signal sent from the higher order controller (not shown) via communication and the front shaft torque detection signal sent from the front shaft torque meter 25 equipped to the tandem dynamometer 20 are inputted, generates the front and rear torque current command signals, and inputs to the inverters 23, 24 via communication. The inverters 23, 24 electrically connected with the dynamometers 21, 22, when the front and rear torque current command signals are inputted from the shaft torque control device 5, cause torque according to these front and rear torque current command signals to be generated in the dynamometers 21, 22. It should be noted that, as the disturbance elements assumed at this time, there is noise generated upon measuring the front shaft torque in the front shaft torque meter 25; and a non-linear shift between the front and rear torque current command signals and the generated torque of the respective dynamometers 21, 22 due to a delay in time in each communication circuit, the control response of the inverters 23, 24, etc. It should be noted that the aforementioned higher order shaft torque command signal may be generated by a higher order controller other than the aforementioned such shaft torque control device 5, or may be generated by a module constructed by another controller K inside of the shaft torque control device 5.

The feedback control system 8 of FIG. 2 is configured by combining the generalized plant P including the nominal model N imitating the input/output characteristics of the test system 1, and the controller K giving input/output to this generalized plant P.

In the generalized plant P, inputs configured by the first disturbance input w1, second disturbance input w2, third disturbance input w3, fourth disturbance input w4 and fifth disturbance input w5, and outputs configured by the first control amount output z1, second control amount output z2, third control amount output z3, fourth control amount output z4, fifth control amount output z5 and sixth control amount output z6 are defined.

In addition, the first observed output y1 corresponding to the deviation between the higher order shaft torque command signal and front shaft torque detection signal, and the second observed output y2 corresponding to the front shaft torque detection signal; and the first control input u1 corresponding to the front torque current command signal and second control input u2 corresponding to the rear torque current command signal are defined between the generalized plant P and controller K.

Example 1

Figure 3:
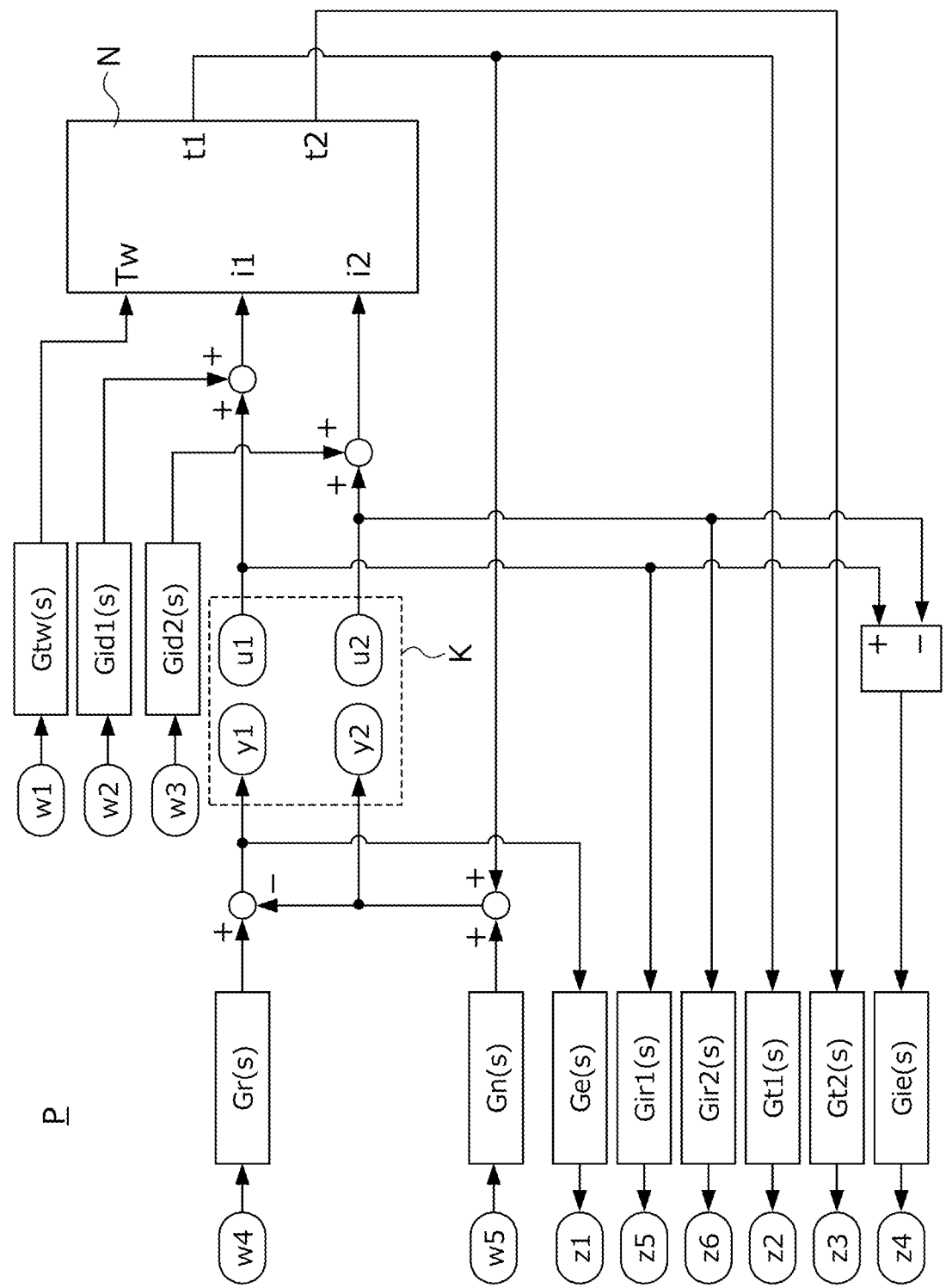
FIG. 3 is a view showing the configuration of a generalized plant used upon designing a shaft torque control device of Example 1.

FIG. 3 is a view showing the configuration of a generalized plant P used upon designing the shaft torque control device of Example 1. The generalized plant P is configured by combining a nominal model N imitating the input/output characteristics of the test system 1 which is the control target, and a plurality of weighting functions Gtw(s), Gid1(s), Gid2(s), Gr(s), Gn(s), Ge(s), Gir1(s), Gir2(s), Gt1(s), Gt2(s), and Gie(s).

The nominal model N includes the input/output characteristics imitating characteristics from the three inputs of the test system 1 explained by referencing FIG. 1 (test piece torque Tw, front torque i1, and rear torque i2), until the two outputs of the test system 1 (front transfer torque t1 and rear transfer torque t2).

The test piece torque Tw corresponds to torque inputted to the test piece W via the output shafts SO1, SO2 by the output-side dynamometers 31, 32 of the test system 1. The front torque i1 corresponds to the torque generated in the front dynamometer 21, based on the front torque current command signal inputted to the front inverter 23 of the test system 1. The rear torque i2 corresponds to the torque generated in the rear dynamometer 22, based on the rear torque current command signal inputted to the rear inverter 24 of the test system 1.

The front transfer torque t1 corresponds to the torque transferred from the output shaft S1 of the front dynamometer 21 to the input shaft SI of the test piece W in the test system 1, i.e. the front shaft torque between the output shaft S1 and input shaft S1. It should be noted that this front transfer torque t1 is detected by the front shaft torque meter 25 in the test system 1. In addition, the rear transfer torque t2 corresponds to torque transferred from the output shaft S2 of the rear dynamometer 22 to the output shaft S1 of the front dynamometer 21 of the test system 1, i.e. rear shaft torque between the output shaft S2 and output shaft S1.

Figure 4:
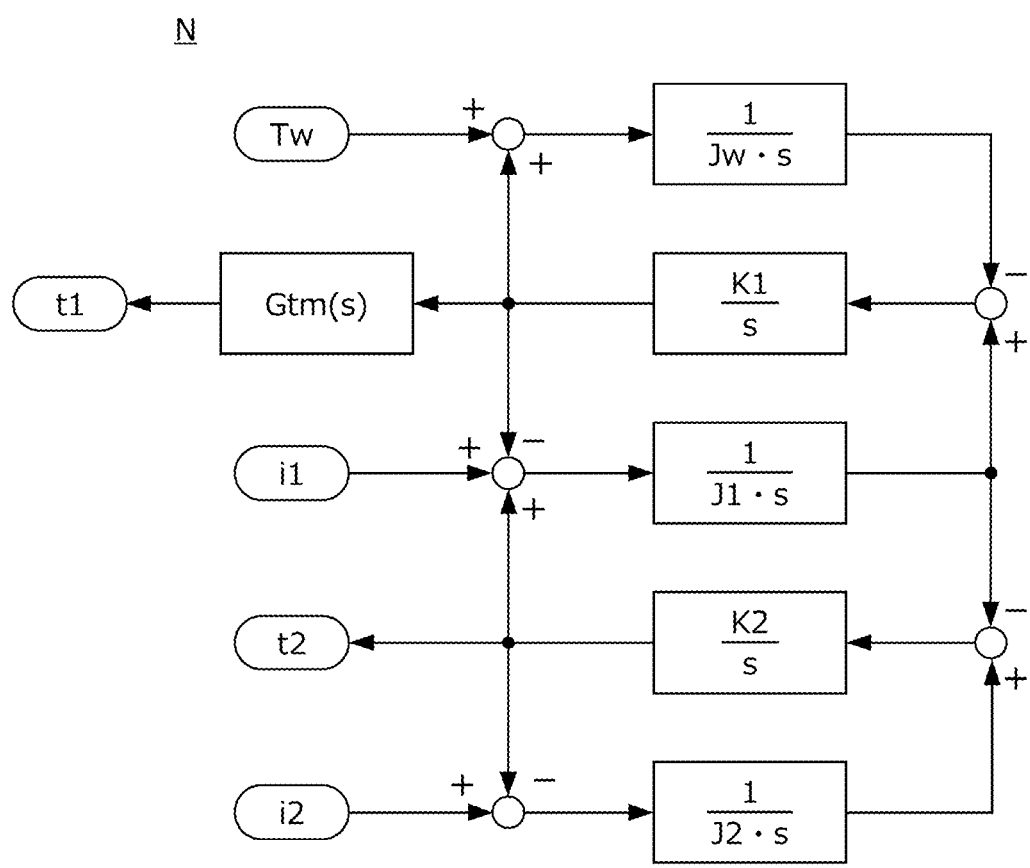
FIG. 4 is a view showing the configuration of a nominal model.

FIG. 4 is a view showing the configuration of the nominal model N. As shown in FIG. 4, the nominal model N is constructed based on a 3-inertia system equation of motion (refer to Formulas (1-1) to (1-5) below) configured by coupling three inertial bodies having a test piece inertial moment Jw, front inertial moment J1 and rear inertial moment J2, in series by two axial bodies having a front torsional rigidity K1 and rear torsional rigidity K2.

$$\omega_w = \frac{1}{Jw \cdot s}\left\{T_w + \frac{K1}{s}(\omega_1 - \omega_w)\right\} \quad (1-1)$$

$$t1 = Gtm(s) \cdot \frac{K1}{s}(\omega_1 - \omega_w) \quad (1-2)$$

$$\omega_1 = \frac{1}{J1 \cdot s}\left\{i1 - \frac{K1}{s}(\omega_1 - \omega_w) + \frac{K2}{s}(\omega_2 - \omega_1)\right\} \quad (1-3)$$

$$t2 = \frac{K2}{s}(\omega_2 - \omega_1) \quad (1-4)$$

$$\omega_2 = \frac{1}{J2 \cdot s}\left\{i2 - \frac{K2}{s}(\omega_2 - \omega_1)\right\} \quad (1-5)$$

In FIG. 4 and the following explanation, "s" is the Laplace operator. The test piece inertial moment Jw corresponds to the inertial moment of the test piece W in the test system 1. The front inertial moment J1 corresponds to the inertial moment of the front dynamometer 21 in the test system 1. The rear inertial moment J2 corresponds to the inertial moment of the rear dynamometer 22 in the test system 1. The front torsional rigidity K1 corresponds to the torsional rigidity of a device connecting the test piece W and the front dynamometer 21 in the test system 1. Rear torsional rigidity K2 corresponds to the torsional rigidity of a device connecting the front dynamometer 21 and rear dynamometer 22 in the test system 1. In addition, the transfer function Gtm(s) in FIG. 4 corresponds to the response characteristic of the front shaft torque meter 25 in the test system 1.

The nominal model N generates the front transfer torque t1 and rear transfer torque t2 based on the test piece torque Tw, front torque i1 and rear torque i2, by using an equation of motion such as that shown in FIG. 4 and the above Formulas (1-1) to (1-5).

Referring back to FIG. 3, a plurality of input/output signals consisting of a first disturbance input w1, second disturbance input w2, third disturbance input w3, fourth disturbance input w4, fifth disturbance input w5, first control amount output z1, second control amount output z2, third control amount output z3, fourth control amount output z4, fifth control amount output z5, sixth control amount output z6, first control input u1, second control input u2, first observed output y1 and second observed output y2 are defined in the generalized plant P. The corresponding relationships of these input/output signals and the test system 1 of FIG. 1 are as follows.

The first disturbance input w1 is an input signal to the generalized plant P, and is a disturbance input for evaluating the test piece torque Tw. In the generalized plant P, the result of weighting the first disturbance input w1 by the first disturbance weighting function Gtw(s) is inputted to the nominal model N as the test piece torque Tw. This first disturbance weighting function Gtw(s) is set according to the frequency characteristic of torque transferred in the test piece W. The torque converter TC included in the test piece W has a characteristic of the test piece torque Tw becoming larger in the low frequency range, and becoming smaller in the high frequency range, due to transferring torque by oil pressure. Therefore, this first disturbance weighting function Gtw(s) is set so as to be larger weight in the high frequency band having a tendency of the test piece torque Tw becoming larger, than in other frequency bands.

The second disturbance input w2 is an input signal to the generalized plant P, and is a disturbance input for evaluating the torque control error of the front inverter 23 and front dynamometer 21 (shift between the front torque current command signal and front torque i1). In the generalized plant P, the sum of adding together the result of weighting the second disturbance input w2 by the second disturbance weighting function Gid1(s) and the first control input u1 by the controller K is inputted to the nominal model N as the front torque i1. This second disturbance weighting function Gid1(s) is set according to the frequency characteristic of the torque control error of the front inverter 23 and front dynamometer 21. Since there is an upper limit in the control response of the front inverter 23, the torque control error has a characteristic of becoming larger in the high frequency band. Therefore, the second disturbance weighting function Gid1(s) is set so as to become a larger weight in the high frequency band having a tendency of the torque control error becoming larger, than in the low frequency band.

The third disturbance input w3 is an input signal to the generalized plant P, and is a disturbance input for evaluating the torque control error of the rear inverter 24 and rear dynamometer 22 (shift between the rear torque current command signal and rear torque i2). In the generalized plant P, the sum of adding together the result of weighting the third disturbance input w3 by the third disturbance weighting function Gid2(s) and the second control input u2 by the controller K is inputted to the nominal model N as the rear torque i2. This third disturbance weighting function Gid2(s) is set according to the frequency characteristic of the torque control error of the rear inverter 24 and rear dynamometer 22. Since there is an upper limit in the control response of the rear inverter 24 similarly to front inverter 23, the torque control error has a characteristic of becoming larger in the high frequency band. Therefore, the third disturbance weighting function Gid2(s) is set so as to become a larger weight in the high frequency band having a tendency of the torque control error becoming larger, than in the low frequency band.

The fifth disturbance input w5 is an input signal to the generalized plant P, and is a disturbance input for evaluating the torque detection error by the front shaft torque meter 25 (shift between the front shaft torque detection signal and the front transfer torque t1). In the generalized plant P, the sum of adding together the result of weighting the fifth disturbance input w5 by the fifth disturbance weighting function Gn(s) and the front transfer torque t1 outputted from the nominal model N is inputted to the controller K as the second observed output y2. This fifth disturbance weighting function Gn(s) is set according to the frequency characteristic of the torque detection error by the front shaft torque meter 25. More specifically, the fifth disturbance weighting function Gn(s) is set so as to be larger weight in the high frequency band having a tendency of the torque detection error being larger, than in the low frequency band having a tendency of the torque detection error being smaller.

The fourth disturbance input w4 is an input signal to the generalized plant P, and is a disturbance input for evaluating the higher order shaft torque command signal. In the generalized plant P, the difference from subtracting the second observed output y2 including the torque detection error in the aforementioned way, from the result of weighting the fourth disturbance input w4 by the fourth distance weighting function Gr(s) is inputted to the controller K as the first observed output y1. This fourth disturbance weighting function Gr(s) is set to a constant, for example.

The first observed output y1 is a signal outputted from the generalized plant P to the controller K, and corresponds to the shaft torque deviation input (higher order shaft torque command signal—front shaft torque detection signal) to the shaft torque control device 5 in the test system 1. This first observed output y1 is calculated by subtracting the second observed output y2 from the result of weighting the fourth disturbance input w4 by the fourth disturbance weighting function Gr(s) in the aforementioned way.

The second observed output y2 is a signal outputted from the generalized plant P and inputted to the controller K, and corresponds to the front shaft torque detection signal to the shaft torque control device 5 in the test system 1. This second observed output y2 is calculated by adding together the result of weighting the fifth disturbance input w5 by the fifth disturbance weighting function Gn(s) in the aforementioned way, and the front transfer torque t1 outputted from the nominal model N.

A first control input u1 is an input generated in the controller K based on the first observed output y1 and second observed output y2, and is applied to a generalized plant P from the controller K, and corresponds to a front torque current command signal from the shaft torque control device 5 in the test system 1. In the generalized plant P, the front torque i1 is calculated by adding together the result of weighting the second disturbance input w2 by the second disturbance weighting function Gid1(s) in the aforementioned way and the first control input u1.

The second control input u2 is an input generated in the controller K based on the first observed output y1 and second observed output y2, and is given to the generalized plant P from the controller K, and corresponds to the rear torque current command signal from the shaft torque control device 5 in the test system 1. In the generalized plant P, the rear torque i2 is calculated by adding together the result of weighting the third disturbance input w3 by the third disturbance weighting function Gid2(s) in the aforementioned way and the second control input u2.

The first control amount output z1 is an output signal of the generalized plant P, and is a control amount output for evaluating the shaft torque deviation input (higher order shaft torque command signal—front shaft torque detection signal) to the shaft torque control device 5 in the test system 1. In the generalized plant P, the first control amount output z1 is calculated by weighting the first observed output y1 by the first control amount weighting function Ge(s). This first control amount weighting function Ge(s) is set so as to have an integral characteristic so that a controller K including a shaft torque deviation suppressing function is obtained.

The second control amount output z2 is an output signal of the generalized plant P, and is a control amount output for evaluating the front transfer torque t1 in the test system 1. In the generalized plant P, the second control amount output z2 is calculated by weighting the front transfer torque t1 outputted from the nominal model N by the second control amount weighting function Gt1(s). This second control amount weighting function Gt1(s) is set based on the resonance characteristic of the device connecting the test piece W and front dynamometer 21, so that a controller K including a resonance suppressing function is obtained. More specifically, the second control amount weighting function Gt1(s) is set so as to be a larger weight in the torsional resonance frequency band of the device connecting the test piece W and front dynamometer 21, than in other frequency bands.

The third control amount output z3 is an output signal of the generalized plant P, and is a control amount output for evaluating the rear transfer torque t2 in the test system 1. In the generalized plant P, the third control amount output z3 is calculated by weighting the rear transfer torque t2 outputted from the nominal model N by the third control amount weighting function Gt2(s). This third control amount weighting function Gt2(s) is set based on the resonance characteristic of the device connecting the front dynamometer 21 and rear dynamometer 22, so that a controller K including a resonance suppressing function is obtained. More specifically, the third control amount weighting function Gt2(s) is set so as to be a larger weight in the torsional resonance frequency band of the device connecting the front dynamometer 21 and rear dynamometer 22, than in other frequency bands.

The fifth control amount output z5 is an output signal of the generalized plant P, and is a control amount output for evaluating the front torque current command signal from the shaft torque control device 5 in the test system 1. In the generalized plant P, the fifth control amount output z5 is calculated by weighting the first control input u1 by the fifth control amount weighting function Gir1(s). This fifth control amount weighting function Gir1(s), for example, is set so as to be larger weight in the high frequency band than in the low frequency band.

The sixth control amount output z6 is an output signal of the generalized plant P, and is a control amount output for evaluating the rear torque current command signal from the shaft torque control device 5 in the test system 1. In the generalized plant P, the sixth control amount output z6 is calculated by weighting the second input u2 by the sixth control amount weighting function Gir2(s). This sixth control amount weighting function Gir2(s), for example, is set so as to be a larger weight in the high frequency band than in the low frequency band.

The fourth control amount output z4 is an output signal of the generalized plant P, and is a control amount output for evaluating the difference between the front torque current command signal from the shaft torque control device 5 and the rear torque current command signal in the test system 1. In the generalized plant P, the fourth control amount output z4 is calculated by weighting the difference from subtracting the second control input u2 from the first control input u1 by the fourth control amount weighting function Gie(s). This fourth control amount weighting function Gie(s) is set so as to have an integral characteristic, so that a controller K including a torque distributing function is obtained. Herein, torque distributing function of the present example refers to a function of controlling the shaft torque so that the front torque current command signal for the front dynamometer 21 and the rear torque current command signal for the rear dynamometer 22 become equal, i.e. so that the torque load of the front dynamometer 21 and the torque load of the rear dynamometer 22 become equal.

Figure 5:
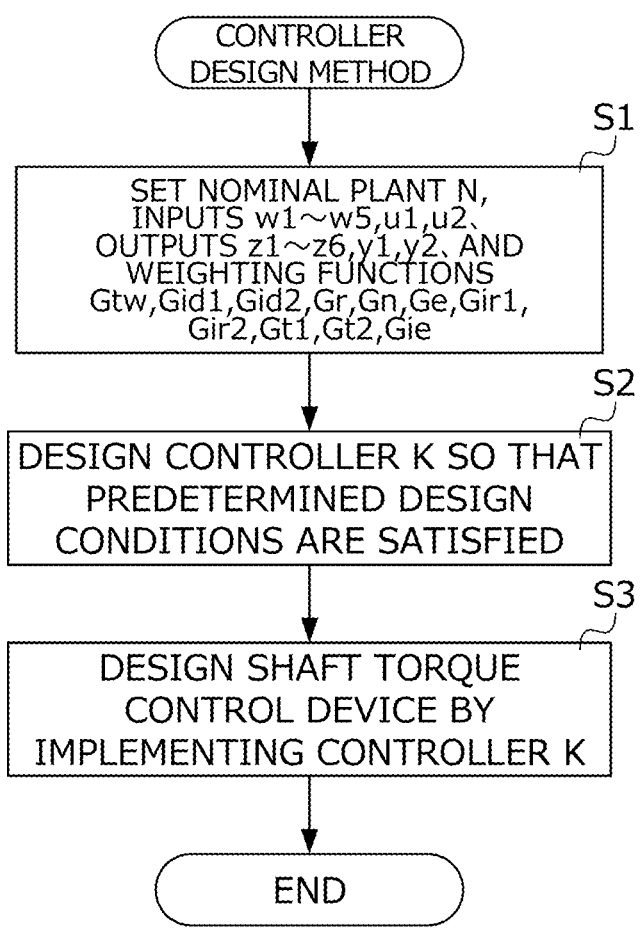
FIG. 5 is a flowchart showing the sequence of designing a shaft torque control device based on the generalized plant.

FIG. 5 is a flowchart showing a sequence of designing a shaft torque control device based on the generalized plant P.

First, in step S1, using a computer, it sets the nominal model N; various inputs w1 to w5, u1 and u2; various outputs z1 to z6, y1 and y2; and weighting functions Gtw(s), Gid1(s), Gid2(s), Gr(s), Gn(s), Ge(s), Gir1(s), Gir2(s), Gt1(s), Gt2(s) and Gie(s), as explained by referencing FIGS. 3 and 4.

Next, in step S2, the controller K is designed by the computer so that a predetermined design condition decided so that robust stability is realized is satisfied in the feedback control system 8 configured by combining the generalized plant P and controller K. More specifically, such a controller K is derived by performing iterative operation based on the D-K iteration method on the computer, for example.

Next, in step S3, it designs the shaft torque control device 5 by implementing the controller K designed in step S2 in a digital signal processor.

Next, the effects of the shaft torque control device of Example 1 designed based on the generalized plant P shown in FIG. 3 will be explained while comparing with the control results from the shaft torque control device of Comparative Example 1 and the shaft torque control device of Comparative Example 2.

Herein, shaft torque control device of Comparative Example 1 is a device which inputs, to the front inverter 23 and rear inverter 24, the result of halving the front torque current command signal as the front torque current command signal and rear torque current command signal, without feeding back the front shaft torque detection signal from the front shaft torque meter 25. In other words, the shaft torque control device of Comparative Example 1 differs from the shaft torque control device of Example 1 in the point of not including the shaft torque deviation suppressing function and resonance suppressing function.

In addition, shaft torque control device of Comparative Example 2 is a device designed based on the generalized plant disclosed in Japanese Patent No. 556144 by the applicants of the present application. In other words, the shaft torque control device of Comparative Example 2 differs from the shaft torque control device of Example 1 in the point of not including the shaft torque deviation suppressing function and torque distributing function.

Figure 6:
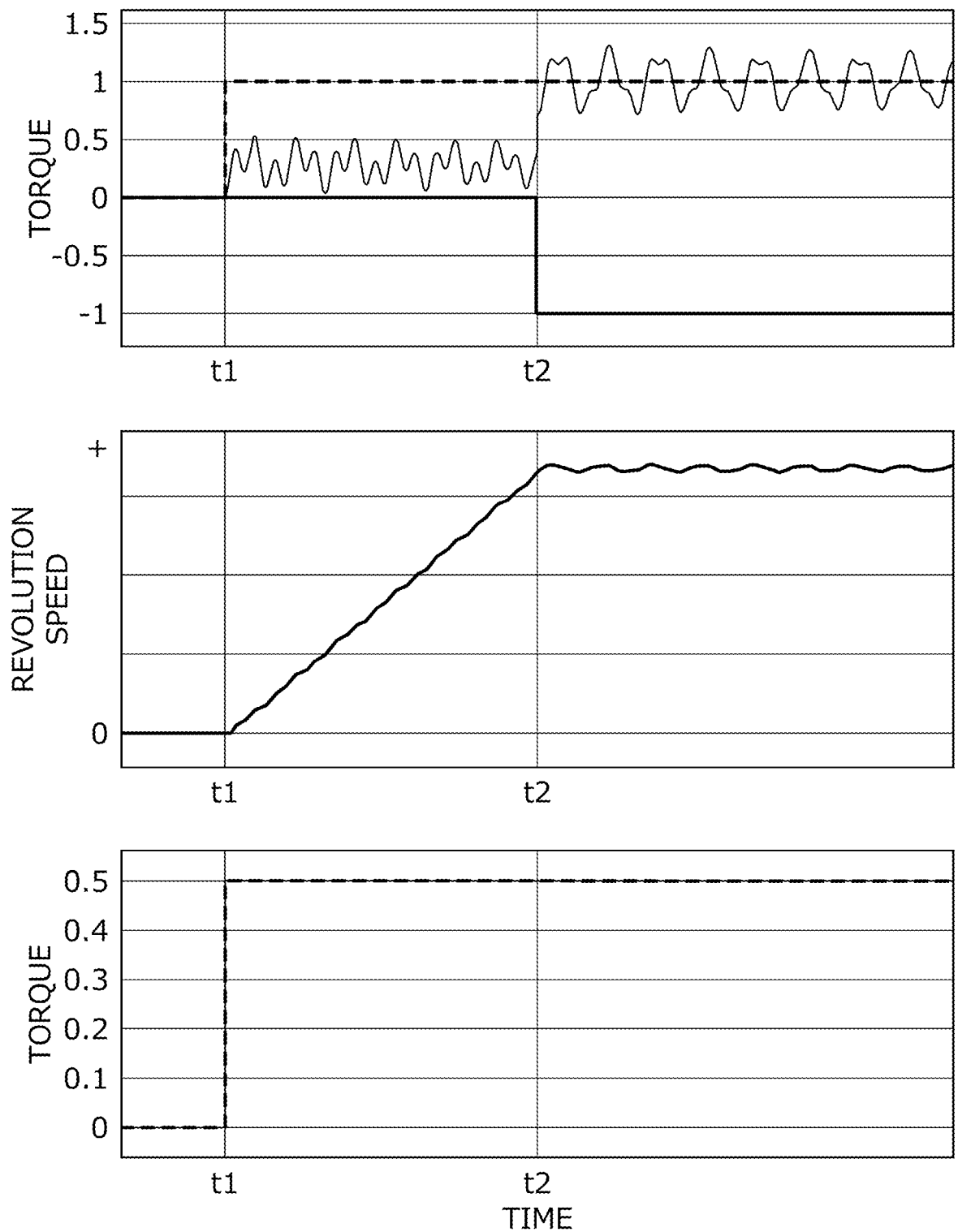
FIG. 6 provides graphs showing control results according to a shaft torque control device of Comparative Example 1.
Figure 7:
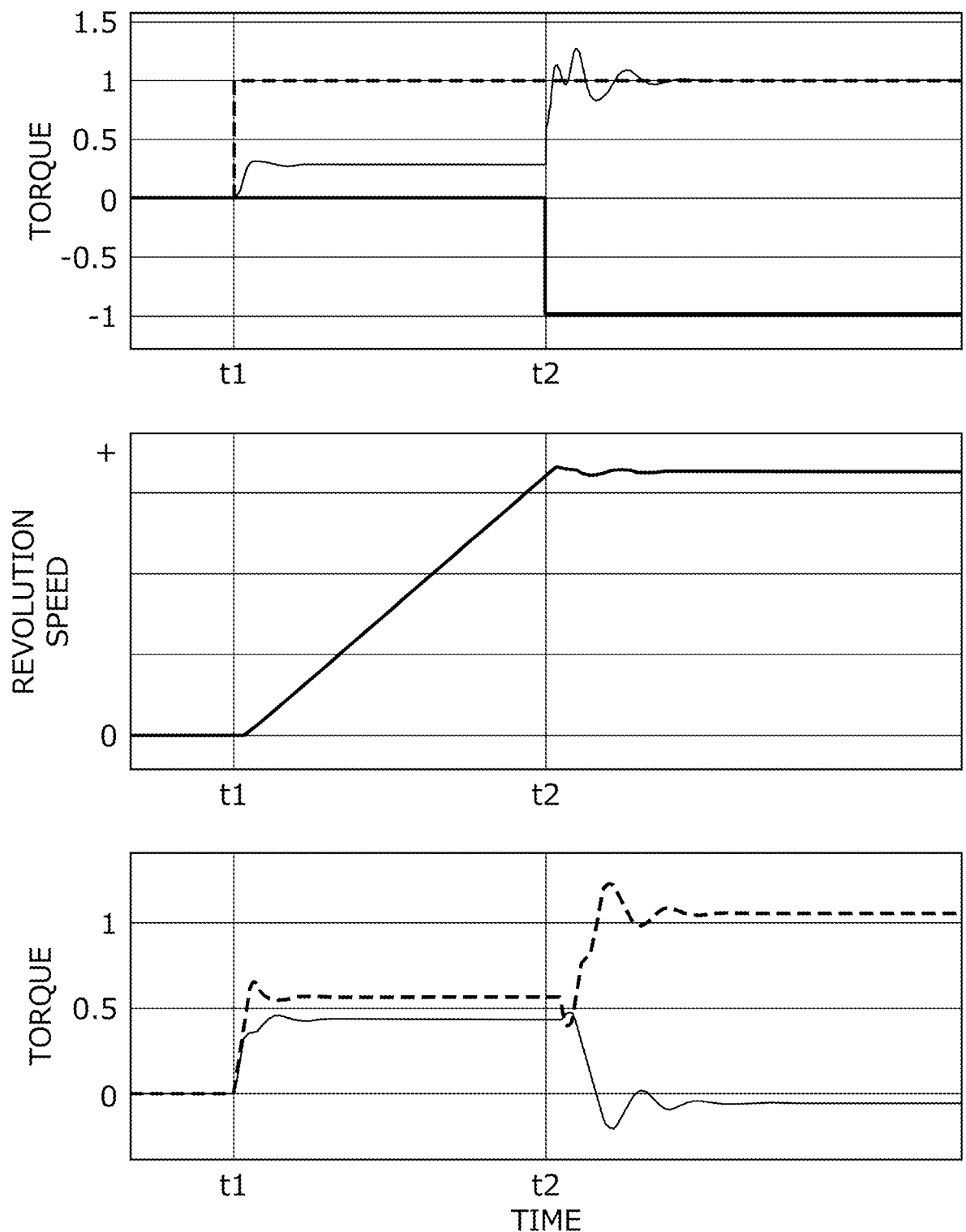
FIG. 7 provides graphs showing control results according to a shaft torque control device of Comparative Example 2.
Figure 8:
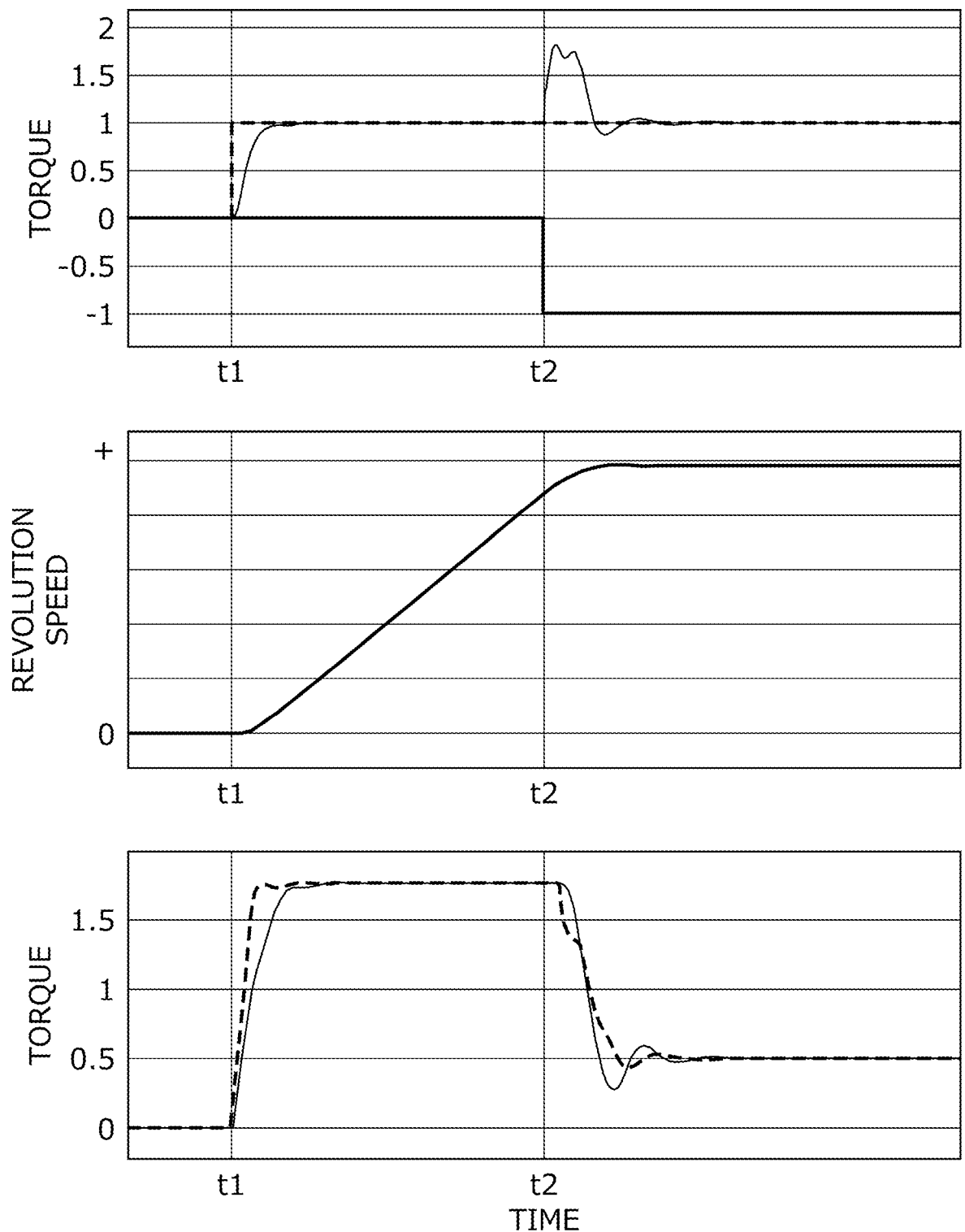
FIG. 8 provides graphs showing control results according to a shaft torque control device of Example 1.

FIG. 6 provides graphs showing the control results by the shaft torque control device of Comparative Example 1, FIG. 7 provides graphs showing the control results by the shaft torque control device of Comparative Example 2, and FIG. 8 provides graphs showing the control results by the shaft torque control device of Example 1. In FIGS. 6 to 8, the lower graph shows the front torque current command signal (thick broken line) and the rear torque current command signal (fine line) generated by each shaft torque control device; the middle graph is the average revolution speed of the front dynamometer 21 and rear dynamometer 22; and the upper graph shows the higher order shaft torque command signal (thick broken line) inputted to each shaft torque control device, the front shaft torque detection signal (fine line) from the front shaft torque meter 25, and the test piece torque (thick line) inputted to the test piece W by the output-side dynamometers 31, 32. In addition, FIGS. 6 to 8 show control results in the case of inputting the higher order shaft torque command signal which changes step-wise from 0 to a positive predetermined value at time t1 to each shaft torque control device, and subsequently inputting the test piece torque which changes step-wise from 0 to a negative predetermined value at time t2. In addition, in FIGS. 6 to 8, the horizontal axis is time, the vertical axis of the upper graph is the ratio of each torque to the higher order shaft torque command signal, the vertical axis of the center graph is the ratio of average revolution speed to a predetermined value, and the vertical axis of the lower graph is the ratio of each torque to a predetermined value.

First, as shown in the lower graph of FIG. 6, the shaft torque control device of Comparative Example 1, when the higher order shaft torque command signal is changed step-wise at time t1, generates a signal halving this higher order shaft torque command signal as the front torque current command signal and rear torque current command signal. Since the shaft torque control device of Comparative Example 1, in the aforementioned way, generates these front and rear torque current command signals without feeding back the front shaft torque detection signal, these front and rear torque current command signals are equal and constant. Since the shaft torque control device of Comparative Example 1 does not include a shaft torque deviation suppressing function in this way, the front shaft torque detection signal and higher order shaft torque command signal at times t1 and later are not matching. In addition, since the shaft torque control device of Comparative Example 1 does not include the resonance suppressing function, it is not possible to suppress torsional resonance occurring between the test piece W and front dynamometer 21 and between the front dynamometer 21 and rear dynamometer 22, a result of which large oscillation appears in the front shaft torque detection signal at times t1 and later. In addition, when inputting a negative test piece torque at time t2, since these torsions become large, the oscillation in the front shaft torque detection signal at times t2 and later further increases.

Next, as shown in the lower graph of FIG. 7, when changing step-wise the higher order shaft torque command signal at time t1, the shaft torque control device of Comparative Example 2 generates the front torque current command signal and rear torque current command signal in response thereto. Herein, the shaft torque control device of Comparative Example 2 generates the front torque current command signal and rear torque current command signal based on the front shaft torque detection signal, so as to suppress torsional resonance which can arise between the test piece W and front dynamometer 21 and between the front dynamometer 21 and rear dynamometer 22, based on the front shaft torque detection signal. For this reason, the shaft torque control device of Comparative Example 2 can suppress oscillation in the front shaft torque detection signal which could not be suppressed with the shaft torque control device of Comparative Example 1 shown in FIG. 6. However, since the shaft torque control device of Comparative Example 2 does not include a shaft torque deviation suppressing function, the front shaft torque detection signal and higher order shaft torque command signal at times t1 and later do not match, similarly to the shaft torque control device of Comparative Example 2. In addition, since the shaft torque control device of Comparative Example 2 does not include a torque distributing function, the ratio of the front torque current command signal to rear torque current command signal at times t1 and later, and the ratio of the front torque current command signal to rear torque current command signal at times t2 and later do not match. For this reason, with the shaft torque control device of Comparative Example 2, the torque load proportions of the front dynamometer 21 and rear dynamometer 22 change every time the test piece torque changes.

In contrast, as shown in FIG. 8, since the shaft torque control device of Example 1 includes a resonance suppressing function, as shown in the upper graph of FIG. 8, it can suppress resonance of the front shaft torque detection signal which could not be suppressed with the shaft torque control device of Comparative Example 1 shown in FIG. 6. In addition, since the shaft torque control device of Example 1 includes a shaft torque deviation suppressing function, when changing step-wise the higher order shaft torque command signal at time t1 as shown in the upper part of FIG. 8, it is possible to make the front shaft torque detection signal quickly follow the change in this higher order shaft torque command signal. In addition, as shown in the upper part of FIG. 8, according to the shaft torque control device of Example 1, it is possible to make the front shaft torque detection signal follow the higher order shaft torque command signal, even if inputting the test piece torque at time t2.

In addition, the shaft torque control device of Example 1 includes a torque distributing function of controlling the shaft torque so that the front torque current command signal and rear torque current command signal become equal. For this reason, as shown in the lower graph of FIG. 8, it is possible to steadily make equal the front torque current command signal and rear torque current command signal. In addition, as shown in the lower graph of FIG. 8, according to the shaft torque control device of Example 1, it is possible to steadily make equal the front torque current command signal and rear torque current command signal, even if inputting the test piece torque at time t2. For this reason, even if changing the test piece torque, the shaft torque control device of Example 1 can make equal the load torques of the front dynamometer 21 and rear dynamometer 22. For this reason, in the case of using the shaft torque control device of Example 1, it is preferable to make equal the capacities of the front dynamometer 21 and rear dynamometer 22.

Example 2

Figure 9:
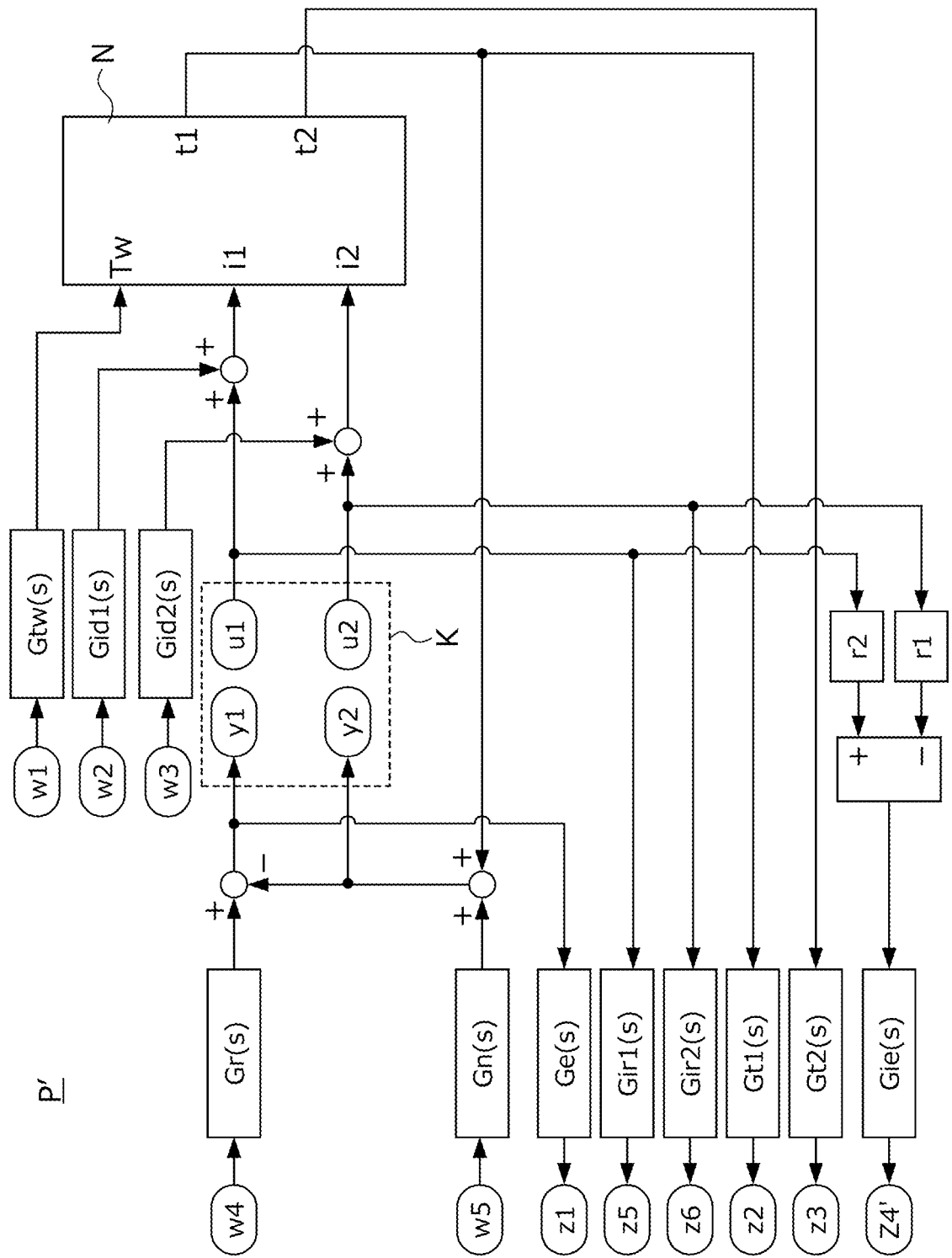
FIG. 9 is a view showing the configuration of a generalized plant used upon designing a shaft torque control device of Example 2.

FIG. 9 is a view showing the configuration of a generalized plant P' used upon designing a shaft torque control device of Example 2. The generalized plant P' according to Example 2 differs from the generalized plant P according to Example 1 shown in FIG. 3, in the configuration of a fourth control amount output z4'. It should be noted that, in the following explanation, the same reference symbols are attached to configurations which are identical to the generalized plant P shown in FIG. 3, and explanations thereof will be omitted.

The fourth control amount output z4' is an output signal of the generalized plant P', and is a control amount output for evaluating the difference between the front torque current command signal and the rear torque current command signal weighted at predetermined proportions in the test system 1. In the generalized plant P', the fourth control amount output z4' is calculated by weighting the difference from subtracting the product of the second control input u2 and a predetermined first target proportion r1 from the product of the first control input u1 and a predetermined second target proportion r2, by the fourth control amount weighting function Gie(s).

Herein, first target proportion r1 is a target for the proportion of the front torque current command signal relative to the sum of the front torque current command signal and the rear torque current command signal in the test system 1, and is set between 0 and 1. In addition, second target proportion r2 is a target for the proportion of the rear torque current command signal relative to the sum of the front torque current command signal and rear torque current command signal in the test system 1, and is set between 0 and 1 so that the sum of the first target proportion r1 and second target proportion r2 becomes 1.

In addition, the fourth control amount weighting function Gie(s) is set so as to have an integral characteristic, so that a controller K including a torque distributing function is obtained. Herein, torque distributing function of the present example refers to a function of controlling the shaft torque so that the ratio of the front torque current command signal relative to the front dynamometer 21 and the rear torque current command signal relative to the rear dynamometer 22 becomes aforementioned the first target proportion to second target proportion (r1:r2), i.e. so that the ratio of the torque load of the front dynamometer 21 and the torque load of the rear dynamometer 22 becomes the first target proportion to the second target proportion.

Figure 10:
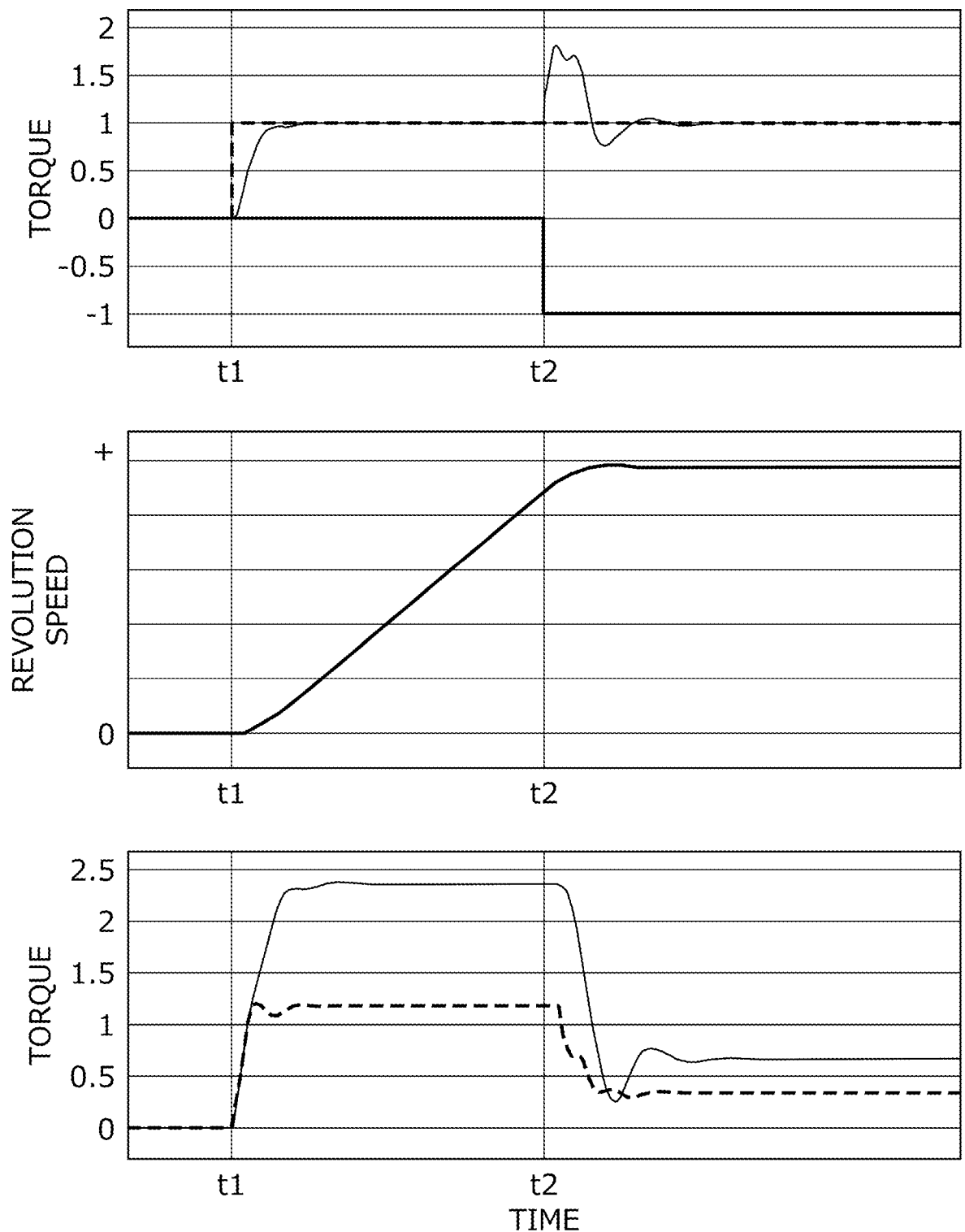
FIG. 10 provides graphs showing control results according to a shaft torque control device of Example 2.

Next, the effects of the shaft torque control device of Example 2 designed based on the generalized plant P' shown in FIG. 9 will be explained while referencing FIG. 10. FIG. 10 is a view showing the control results by the shaft torque control device of Example 2. It should be noted that FIG. 10, similarly to the aforementioned FIGS. 6 to 8, shows the control results in the case of inputting the higher order shaft torque command signal and shaft torque which change step-wise at time t1 and time t2, respectively, to the shaft torque control device of Example 2. In addition, FIG. 10 shows a case of setting as first target proportion r1:second target proportion r2=1:2.

As is evident by comparing FIG. 10 and FIG. 8, according to the shaft torque control device of Example 2, the resonance suppressing function and shaft torque deviation suppressing function are obtained, similarly to the shaft torque control device of Example 1. In addition, the shaft torque control device of Example 2 includes the torque distributing function of controlling the shaft torque so that the ratio of the front torque current command signal and rear torque current command signal becomes the first target proportion r1 to second target proportion r2. For this reason, as shown in the lower graph of FIG. 10, it is possible to steadily set the ratio of the front torque current command signal and the rear torque current command signal to r1:r2. In addition, as shown in the lower graph of FIG. 10, according to the shaft torque control device of Example 2, it is possible to steadily set the ratio of these torque current command signals to r1:r2, even if inputting the test piece torque at time t2. For this reason, in the case of using the shaft torque control device of Example 2, it is preferable to use dynamometers of different capacities in the front dynamometer 21 and rear dynamometer 22. In other words, in the case of dynamometers of difference capacities being used as the front dynamometer 21 and rear dynamometer 22, it is preferable to set the first target proportion r1 and second target proportion r2 according to the ratio of capacities, so that the electrical current duties of these front dynamometer 21 and rear dynamometer 22 become equal.

Although an embodiment of the present invention has been explained above, the present invention is not to be limited thereto. The configuration of detailed parts may be modified as appropriate within the scope of the gist of the present invention.

For example, a case of applying the present invention to the shaft torque control device 5 of a test system of a drivetrain defining load equipment connected to the tandem dynamometer 20 as the test piece W which is the drivetrain of a vehicle was explained in the above-mentioned embodiment; however, the present invention is not to be limited thereto. The shaft torque control device of the present invention can be applied to an engine bench system establishing the load equipment as the engine of the vehicle. In addition, the load equipment is not limited to a component of a vehicle such as a drivetrain or engine, and may be any equipment so long as including a shaft.

EXPLANATION OF REFERENCE NUMERALS 1 test system (tandem motor system)
W test piece (load equipment, drivetrain)
S1 input shaft (load shaft)
SO1, SO2 output shaft
20 tandem dynamometer
21 front dynamometer (first motor)
S1 output shaft
22 rear dynamometer (second motor)
S2 output shaft
25 front shaft torque meter 25 (shaft torque detector)
31 first output-side dynamometer (load motor)
32 second output-side dynamometer (load motor)
5 shaft torque control device
8 feedback control system
P generalized plant
Z1 first control amount output
Ge(s) first control amount weighting function (first weighting function)
Z2 second control amount output
Gt1(s) second control amount weighting function (second weighting function)
Z3 third control amount output
Gt2(s) third control amount weighting function (third weighting function)
z4, z4' fourth control amount output
Gie(s) fourth control amount weighting function (fourth weighting function)
N nominal model
i1 front torque (first model input)
i2 rear torque (second model input)
t1 front transfer torque (first model output)
t2 rear transfer torque (second model output)
K controller
u1 first control input
u2 second control input
y1 first observed output
y2 second observed output

The invention claimed is:

1. A tandem motor system comprising:
load equipment including a load shaft;
a first motor having a first output shaft connected to the load shaft, and which generates torque on the first output shaft according to a first torque current command signal;
a second motor having a second output shaft connected to the first output shaft, and which generates torque on the second output shaft according to a second torque current command signal;
a front shaft torque detector which generates a front shaft torque detection signal according to front shaft torque between the load shaft and the first output shaft; and
a shaft torque control device generating the first torque current command signal and the second torque current command signal so as to suppress shaft torque deviation between a shaft torque command signal for the front shaft torque and the front shaft torque detection signal,
wherein the shaft torque control device is configured by implementing in a processor a controller which is designed by calculation in a computer so as to satisfy a predetermined design condition in a virtual feedback control system,
wherein the virtual feedback control system including: a generalized plant having a nominal model imitating an input/output characteristic of a control target including the load equipment, the first and second motors and the front shaft torque detector; and the controller for applying to the generalized plant a first control input corresponding to the first torque current command signal and a second control input corresponding to the second torque current command signal, based on a first observed output corresponding to the shaft torque deviation and a second observed output corresponding to the front shaft torque detection signal,
wherein the nominal model generates a first model output corresponding to a shaft torque between the load equipment and the first motor, and a second model output corresponding to a shaft torque between the first motor and the second motor, based on a first model input generated based on the first control input and a second model input generated based on the second control input, and
wherein the generalized plant defines a first control amount output obtained by weighting the first observed output by a first weighting function with an integral characteristic, a second control amount output obtained by weighting the first model output by a second weighting function, and a third control amount output obtained by weighting the second model output by a third weighting function.

2. The tandem motor system according to claim 1, wherein the generalized plant further defines a fourth control amount output obtained by weighting a difference between the first control input and the second control input by a fourth weighting function.

3. The tandem motor system according to claim 2, wherein the fourth weighting function has an integral characteristic.

4. The tandem motor system according to claim 3, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

5. The tandem motor system according to claim 2, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

6. The tandem motor system according to claim 1, wherein a target for a proportion of the first torque current command signal relative to a sum of the first torque current command signal and the second torque current command signal is defined as a first target proportion, and a target for a proportion of the second torque current command signal relative to the sum is defined as a second target proportion, and
wherein the generalized plant further defines a fourth control amount output obtained by weighting a difference between a product of the first control input and the second target proportion and a product of the second control input and the first target proportion, by a fourth weighting function.

7. The tandem motor system according to claim 6, wherein the fourth weighting function has an integral characteristic.

8. The tandem motor system according to claim 7, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

9. The tandem motor system according to claim 6, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

10. The tandem motor system according to claim 1, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

11. The tandem motor system according to claim 10, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

12. The tandem motor system according to claim 1, wherein the second weighting function is set so as to be a larger weight in a torsional resonance frequency band of a device connecting the load equipment and the first motor than in other frequency band, and
wherein the third weighting function is set so as to be a larger weight in a torsional resonance frequency band of a device connecting the first motor and the second motor than in other frequency band.

13. The tandem motor system according to claim 12, wherein the load equipment is a drivetrain for a vehicle which changes speed of dynamic force inputted to the load shaft and transfers to an output shaft, and
wherein the control target is a test system of a drivetrain including a load motor that applies load to the output shaft, the load shaft, the first motor, the second motor, and the front shaft torque detector.

* * * * *